(12) United States Patent
Aburada et al.

(10) Patent No.: US 9,145,324 B2
(45) Date of Patent: Sep. 29, 2015

(54) ROLLER PAIRS FOR PROCESSING GLASS RIBBONS AND DRAW APPARATUSES INCORPORATING THE SAME

(71) Applicant: Corning Incorporated, Corning, NY (US)

(72) Inventors: Tomohiro Aburada, Shizuoka (JP); Masumi Kihata, Shizuoka (JP); Gautam Narendra Kudva, Horseheads, NY (US); Michael Yoshiya Nishimoto, Horseheads, NY (US); James Paul Peris, Horseheads, NY (US); George Davis Treichler, Hammondsport, NY (US)

(73) Assignee: Corning Incorporated, Corning, NY (US)

( * ) Notice: Subject to any disclaimer, the term of this patent is extended or adjusted under 35 U.S.C. 154(b) by 30 days.

(21) Appl. No.: 13/721,537

(22) Filed: Dec. 20, 2012

(65) Prior Publication Data

US 2014/0174132 A1 Jun. 26, 2014

(51) Int. Cl.
*C03B 13/00* (2006.01)
*C03B 17/06* (2006.01)

(52) U.S. Cl.
CPC .................... *C03B 17/068* (2013.01)

(58) Field of Classification Search
CPC ........................ F15B 15/1447–15/1471; F15B 2211/305–2211/775; F15B 2211/86–2211/8752; F16K 11/0176; F16K 13/04; F16K 31/002–31/1655; F16K 99/0007–99/0051; C03B 17/068; C03B 13/16; C03B 13/04; C03B 17/064; C03B 17/067

USPC ................ 91/169.1, 317–335, 288, 416–461; 92/11–12, 28, 52, 82–85, 163–164; 65/53, 90, 91, 163, 101, 152, 158, 160, 65/162, 186, 195, 199, 201, 202, 205, 253, 65/29.12, 29.19, 370.1, 97

See application file for complete search history.

(56) References Cited

U.S. PATENT DOCUMENTS 3,524,383 A * 8/1970 Locke ............................... 91/35
3,830,139 A * 8/1974 Wachsman et al. ................. 92/9

(Continued)

FOREIGN PATENT DOCUMENTS

AM    1458333      12/1976
DE    2403170 A *  7/1975

(Continued)

OTHER PUBLICATIONS

PCT/US2013/074869 Search Report.

*Primary Examiner* — Jodi C Franklin
(74) *Attorney, Agent, or Firm* — Kevin M. Able (57) ABSTRACT

Roller pairs and draw apparatus for processing glass ribbons are disclosed. The roller pairs applying force to a glass ribbon moving through the draw apparatus. The roller pairs include a first roller assembly and a second roller assembly positioned along opposite sides of the glass ribbon. A shaft of the second roller assembly is coupled to an actuation system that includes a repositionable support member allowing translation of the shaft of the second roller assembly in a direction transverse to the draw direction of the glass ribbon, a pneumatic actuator controlling a position of the contact wheel of the second roller assembly in the direction transverse to the draw direction of the glass ribbon, and a pneumatic reservoir in fluid communication with the pneumatic actuator delivering fluid at an elevated pressure to the pneumatic actuator.

21 Claims, 5 Drawing Sheets

(56) References Cited

U.S. PATENT DOCUMENTS

| | | | |
|---|---|---|---|
| 4,467,605 A * | 8/1984 | Smith | 60/577 |
| 4,856,274 A * | 8/1989 | Cox | 60/803 |
| 4,907,495 A * | 3/1990 | Sugahara | 92/9 |
| 5,024,144 A * | 6/1991 | Muller | 92/13.5 |
| 6,442,823 B1 * | 9/2002 | Thompson | 29/524.1 |
| 6,481,669 B1 * | 11/2002 | Griffin | 244/137.4 |
| RE40,875 E | 8/2009 | Minogue et al. | 482/110 |
| 7,770,414 B2 | 8/2010 | Cimo et al. | 65/273 |
| 8,047,085 B2 * | 11/2011 | Cady et al. | 73/862.49 |
| 8,146,388 B2 * | 4/2012 | Anderson et al. | 65/205 |
| 8,528,364 B2 * | 9/2013 | Anderson et al. | 65/91 |
| 8,590,873 B2 | 11/2013 | Zhou et al. | 269/20 |
| 8,627,684 B2 * | 1/2014 | Shultz et al. | 65/91 |
| 8,789,727 B2 * | 7/2014 | Mortazavi | 222/327 |
| 2004/0007021 A1 | 1/2004 | Igo et al. | 65/101 |
| 2005/0268655 A1 * | 12/2005 | Butts et al. | 65/29.12 |
| 2009/0107182 A1 * | 4/2009 | Anderson et al. | 65/90 |
| 2010/0139475 A1 * | 6/2010 | Plavnik | 91/55 |
| 2012/0144864 A1 * | 6/2012 | Tsuda et al. | 65/53 |
| 2012/0304695 A1 * | 12/2012 | Lakota et al. | 65/29.19 |

FOREIGN PATENT DOCUMENTS

| | | | |
|---|---|---|---|
| EP | 1127853 B1 | 2/2001 | |
| JP | 7301206 | 11/1995 | F15B 11/06 |
| WO | WO 2010068204 A1 * | 6/2010 | |

* cited by examiner

ROLLER PAIRS FOR PROCESSING GLASS RIBBONS AND DRAW APPARATUSES INCORPORATING THE SAME

TECHNICAL FIELD

The present disclosure relates to apparatuses used to apply force to a glass ribbon in a manufacturing process and, in particular, to low-friction roller pairs and draw apparatuses incorporating the same controlling the pinch force applied by the roller pairs.

BACKGROUND

Fusion draw processes are used in glass manufacturing operations to produce thin glass sheets that are used in a variety of products including flat panel displays. Glass sheets produced according to these processes typically exhibit enhanced flatness and smoothness compared to glass produced by different methods, such as the float method.

In order to produce glass ribbon in a draw process, pulling forces are applied to the glass ribbon in the direction of the draw via contact rollers while the glass is in a visco-elastic state. The glass ribbon is drawn by rollers which apply the pulling forces to stretch the glass ribbon in a draw direction (i.e., in a direction of glass travel) and in a cross-draw direction normal to the draw direction. The pulling forces process the glass to the desired thickness for use in commercial goods.

The physical interface of the rollers with the glass ribbon affects the stability of the glass ribbon during the draw process and affects the attributes of finished glass articles produced from the glass ribbon. In particular, the normal (pinch) force and normal force variation applied across the thickness of the glass ribbon by opposing rollers may affect glass attributes. Friction in the system used to manage the pinch force between opposing rollers reduces the effective normal force applied to the glass ribbon, and may lead to periodic and/or random variation in the force applied to the glass ribbon. Reduction in pinch force variation may reduce glass ribbon tension and reduce glass ribbon non-uniformity.

Accordingly, roller pairs and draw apparatuses incorporating roller pairs having alternative pinch force management systems are desired.

SUMMARY

The embodiments described herein relate to apparatuses used in a glass manufacturing process to apply tension to a glass ribbon as it moves from a viscous state to a more elastic state. In embodiments according to the present disclosure, pulling force is applied to the glass ribbon by a series of rollers that are positioned opposite the thickness of the glass ribbon. By controlling normal force (i.e., the pinch force applied between the opposing rollers in a direction corresponding to the thickness of the glass ribbon), tension in the glass ribbon can be managed. Reducing friction in the components controlling the pinch force between the opposing rollers may reduce variation in tension applied to the glass ribbon, which may reduce variation in the properties of the glass ribbon.

According to various embodiments, a roller pair for applying force to a glass ribbon moving in a draw direction includes a first roller assembly and a second roller assembly positioned along opposite sides of the glass ribbon. The first and second roller assemblies each include a shaft and a contact wheel coupled to the shaft, where the shaft of the first roller assembly is coupled to a support frame, and the shaft of the second roller assembly is coupled to an actuation system. The actuation system includes a repositionable support member allowing translation of the shaft of the second roller assembly in a direction transverse to the draw direction of the glass ribbon, a pneumatic actuator controlling a position of the contact wheel of the second roller assembly in the direction transverse to the draw direction of the glass ribbon, and a pneumatic reservoir in fluid communication with the pneumatic actuator delivering fluid at the desired elevated pressure to the pneumatic actuator.

According to other embodiments, a draw apparatus for applying force to a glass ribbon moving in a draw direction includes a support frame and a plurality of roller pairs arranged at positions in the draw direction. Each of the plurality of roller pairs include a first roller assembly and a second roller assembly positioned along opposite sides of the glass ribbon, the first and second roller assemblies each comprising a shaft and a contact wheel coupled to the shaft. The shaft of the first roller assembly is coupled to the support frame, and the shaft of the second roller assembly is coupled to an actuation system. The actuation system includes a repositionable support member allowing translation of the shaft of the second roller assembly in a direction transverse to the draw direction of the glass ribbon, a pneumatic actuator controlling a position of the contact wheel of the second roller assembly in the direction transverse to the draw direction of the glass ribbon, a pneumatic reservoir, and a fluid manifold coupled to pneumatic actuators of each of the roller pairs and the pneumatic reservoir placing the pneumatic reservoir in fluid communication with pneumatic actuators of each of the roller pairs.

Additional features and advantages of the embodiments described herein will be set forth in the detailed description which follows, and in part will be readily apparent to those skilled in the art from that description or recognized by practicing the embodiments described herein, including the detailed description that follows, the claims, as well as the appended drawings.

It should be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
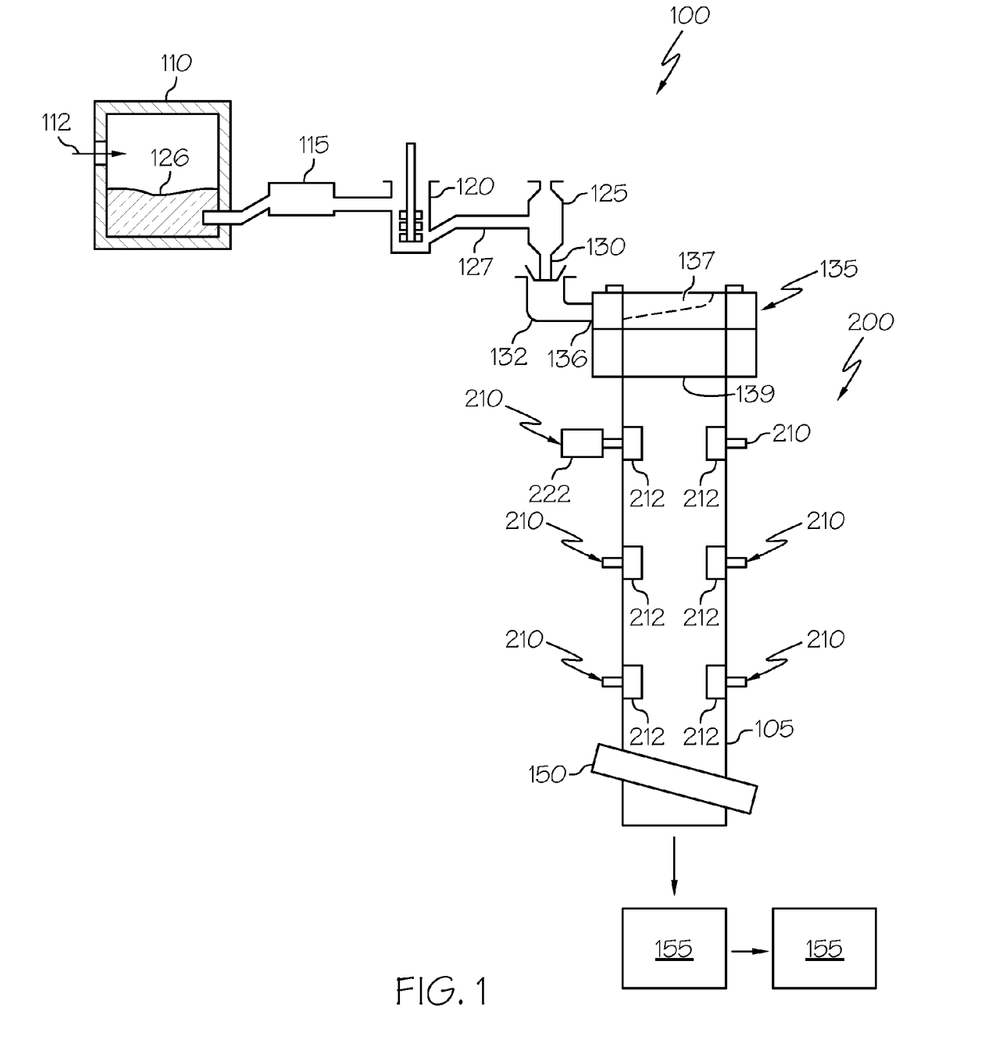
FIG. 1 schematically depicts a glass manufacturing apparatus according to one or more embodiments shown or described herein.

Reference will now be made in detail to embodiments of roller pairs and draw apparatuses used in glass ribbon manufacturing operations. Whenever possible, the same reference numerals will be used throughout the drawings to refer to the same or like parts. FIG. 1 generally depicts a glass manufacturing apparatus used in the production of glass in a draw operation. The glass manufacturing apparatus processes batch materials into molten glass, which is introduced to a forming apparatus from which the molten glass flows to form a glass ribbon. The glass ribbon is contacted by a plurality of roller pairs positioned proximate to the glass ribbon. The roller pairs contact the glass ribbon and apply force to the glass ribbon to control parameters, such as the linear speed and thickness, of the subsequently solidified glass ribbon.

Draw apparatuses according to the present disclosure incorporate roller pairs having pneumatic actuators that control positioning of at least one of the rollers in the roller pair. The pneumatic actuators also control the pinch force applied to the glass ribbon between corresponding rollers in the roller pair. Because the pneumatic actuators and the components of the roller pairs may exhibit low friction in their retract and extend translational movements, the pneumatic actuators may provide reduced variation in the tension applied to the glass ribbon as compared to other pinch force control systems having higher friction. Additionally, pneumatic actuators may be incorporated at a variety of positions along the draw apparatus to contact the glass ribbon, thereby managing glass ribbon tension at a plurality of positions along the glass ribbon. The pneumatic actuators may provide reliable and repeatable pinch force control along the glass ribbon, thereby providing a stable, uniform force profile on the glass ribbon and enabling superior sheet attributes. In addition, the pneumatic actuators enable remote actuation to enable a rapid response to process perturbations.

Referring now to FIG. 1, a glass manufacturing apparatus 100 that incorporates a fusion process to produce a glass ribbon 105 is depicted. The glass manufacturing apparatus 100 includes a melting vessel 110, a fining vessel 115, a mixing vessel 120, a delivery vessel 125, a forming apparatus 135, a draw apparatus 200, and a cutting apparatus 150. The glass manufacturing apparatus 100 produces a continuous glass ribbon 105 from batch materials, by melting and combining the batch materials into molten glass, distributing the molten glass into a preliminary shape, applying tension to the glass ribbon 105 to control the dimensions of the glass ribbon 105 as the glass cools and viscosity increases, and cutting discrete glass sheets 155 from the glass ribbon 105 after the glass has gone through a visco-elastic transition and has mechanical properties that that give the glass sheets 155 stable dimensional characteristics.

In operation, batch materials for forming glass are introduced into the melting vessel 110 as indicated by arrow 112 and are melted to form molten glass 126. The molten glass 126 flows into the fining vessel 115, which is maintained at a temperature above that of the melting vessel 110. From the fining vessel 115, the molten glass 126 flows into a mixing vessel 120, where the molten glass 126 undergoes a mixing process to homogenize the molten glass 126. The molten glass 126 flows from the mixing vessel 120 to the delivery vessel 125, which delivers the molten glass 126 through a downcomer 130 to an inlet 132 and into the forming apparatus 135.

The forming apparatus 135 depicted in FIG. 1 is used in a fusion draw process to produce glass ribbon 105 that has high surface quality and low variation in thickness. The forming apparatus 135 includes an opening 136 that receives the molten glass 126. The molten glass 126 flows into a trough 137 and then overflows and runs down the sides of the trough 137 in two partial ribbon portions before fusing together below the root 139 of the forming apparatus 135. The two partial ribbon portions of the still-molten glass 126 rejoin with one another (e.g., fuse) at locations below the root 139 of the forming apparatus 135, thereby forming a glass ribbon 105. The glass ribbon 105 is drawn downward from the forming apparatus by the draw apparatus 200. While the forming apparatus 135 is shown and described herein implements a fusion draw process, it should be understood that other forming apparatuses may be used including, without limitation, slot draw apparatuses and the like.

As shown in FIG. 1, the draw apparatus 200 includes a plurality of roller pairs 210 arranged at positions along the draw apparatus 200 to contact the glass ribbon 105 as the glass ribbon 105 moves through the draw apparatus 200. In the embodiment depicted in FIG. 1, the roller pairs 210 include rollers 212 that extend across only a portion of the width of the glass ribbon 105, and are positioned proximate to the edges of the glass ribbon 105. In other embodiments (not shown), the roller pairs 210 may include rollers that extend across the entire width of the glass ribbon 105. The roller pairs 210 contact the glass ribbon 105 on opposite surfaces of the glass ribbon 105 separated by the thickness of the glass ribbon 105.

As will be discussed in greater detail below, embodiments of the draw apparatus 200, the roller pairs 210 include a drive motor 222 that is adapted to provide torque to elements of the roller pair 210 that contact the glass ribbon 105 as the glass ribbon moves through the draw apparatus 200. The various roller pairs 210 of the draw apparatus 200 are adapted to vary in operation as to manage parameters of the glass ribbon 105. For example, at one elevation of the roller pairs 210, the drive motor 222 may introduce a pulling force to the glass ribbon 105 that corresponds to the direction of torque application of the drive motor 222. At another elevation of the roller pairs 210, the drive motor 222 may vary torque application and direction to manage the linear speed rate of the glass ribbon 105. At yet another elevation of the roller pairs 210, the drive motor may vary torque application and direction to maintain tension along the glass ribbon 105 as to control thickness and width.

Figure 2:
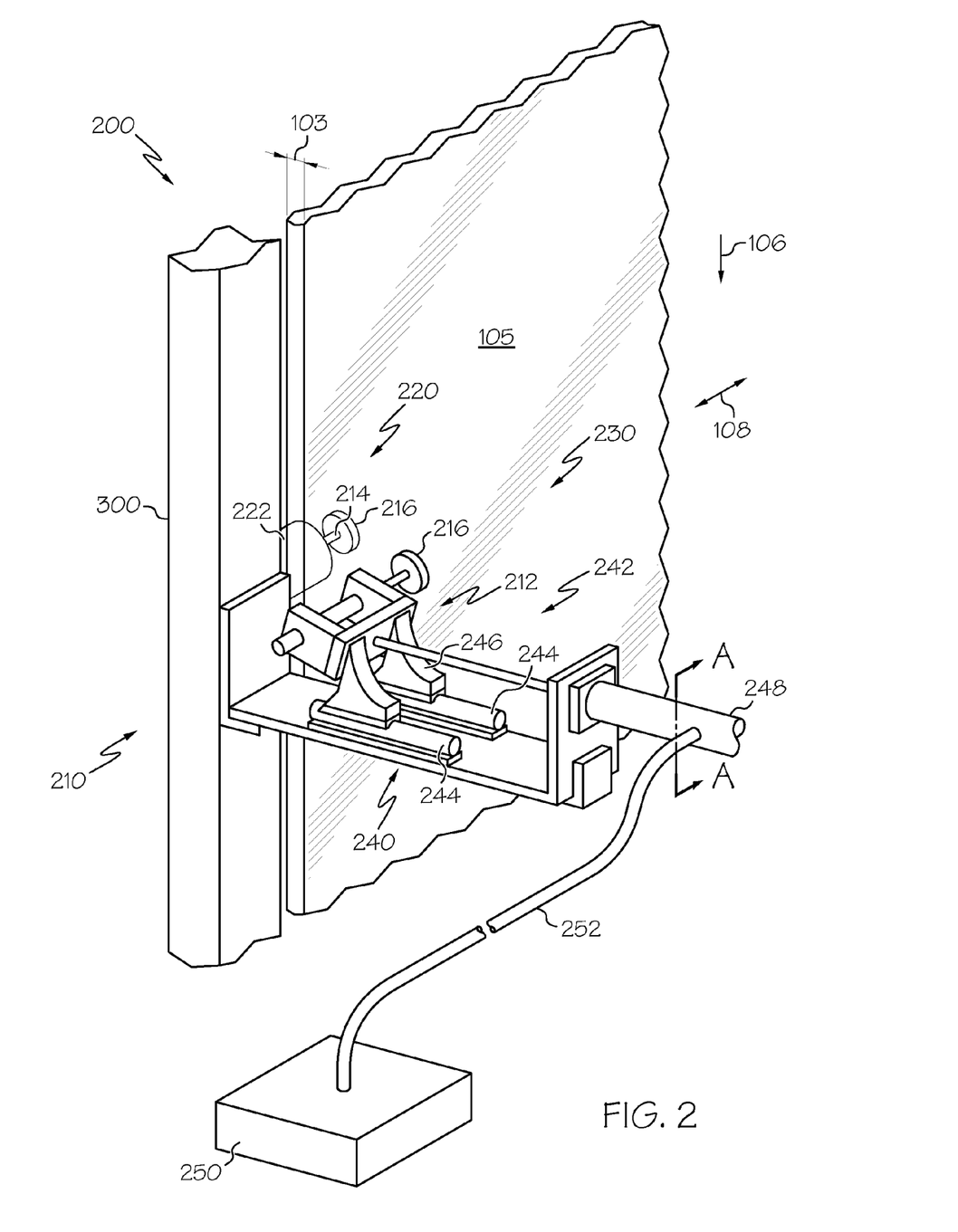
FIG. 2 schematically depicts a partial perspective view of a roller pair of a glass manufacturing apparatus according to one or more embodiments shown or described herein.

One embodiment of the roller pairs 210 is depicted in greater detail in FIG. 2. It should be understood that each of the roller pairs 210 in the draw apparatus 200 may include elements as depicted in FIG. 2 below. In the embodiment depicted in FIG. 2, the first roller assembly 220 includes a drive motor 222 that is coupled to the shaft 214. The drive motor 222 is adapted to provide torque to the contact wheel 216 through the shaft 214. When the contact wheel 216 remains in contact with the glass ribbon 105, the contact wheel 216 introduces the pulling force to the glass ribbon 105. The pulling force, along with gravitational forces due to the weight of the glass ribbon 105, may maintain tension on the glass ribbon 105 in the draw direction 106 of the glass ribbon 105, as well as the cross-draw direction 108 of the glass ribbon 105.

Operation of the plurality of roller pairs 210 is controlled for a variety of conditions including, for example and without limitation, torque applied to the glass ribbon 105 and rate of rotation of the first and second roller assemblies 220, 230. The pulling forces applied to the glass ribbon 105 by the plurality of roller pairs 210 while the glass ribbon 105 is still in a visco-elastic state cause the glass ribbon 105 to pull or stretch, thereby controlling the geometric dimensions of the glass ribbon 105 by controlling the tension applied to the glass ribbon 105 as the glass ribbon 105 moves through the draw apparatus 200. As the glass ribbon 105 is drawn through the draw apparatus 200, the glass has an opportunity to cool. Glass manufacturing apparatuses having a plurality of roller pairs 210 may improve the control and consistency of the cross-draw tension and/or down-drawn tension in the area in which the glass ribbon 105 goes through a visco-elastic transformation. This area is defined as the "setting zone" in which the stress and flatness are set into the glass ribbon 105.

Still referring to FIG. 2, the first roller assembly 220 of the depicted embodiment of the draw apparatus 200 is coupled to a support frame 300 of the draw apparatus 200. In this embodiment, the drive motor 222 is rigidly coupled to the support frame 300 by a bracket (not shown) that prevents deflection of the drive motor 222, and therefore the shaft 214 and the contact wheel 216 of the first roller assembly 220 when forces are applied to the contact wheel 216.

The second roller assembly 230 of the depicted embodiment of the draw apparatus 200 includes an actuation system 240 that controls the position of the second roller assembly 230 relative to the glass ribbon 105 in the thickness direction 103. The actuation system 240 includes a repositionable support member 242 coupled to the shaft 214 of the second roller assembly 230 that allows translation of the shaft 214 in a direction transverse to the draw direction of the glass ribbon 105. In the embodiment depicted in FIG. 2, the repositionable support member 242 includes a linear bearing element 244 and a movable frame 246. The movable frame 246 slides along the linear bearing element 244 in a direction transverse to the draw direction (here the movable frame 246 translates in the thickness direction 103 of the glass ribbon 105).

The second roller assembly 230 also includes a pneumatic actuator 248 coupled to the support frame 300 of the draw apparatus 200 and the movable frame 246 of the second roller assembly 230. The pneumatic actuator 248 controls the position of the shaft 214, and therefore the contact wheel 216, of the second roller assembly 230 relative to the glass ribbon 105. The pneumatic actuator 248 is adapted to extend and retract, thereby modifying the position of the contact wheel 216 relative to the glass ribbon 105. Further, the pneumatic actuator 248 is adapted to maintain a force between the contact wheel 216 and the glass ribbon 105 such that the contact wheels 216 of the first roller assembly 220 and the second roller assembly 230 maintain a pinch force on the glass ribbon 105.

In the embodiment depicted in FIG. 2, the contact wheel 216 of the first roller assembly 220 is actively controlled by the drive motor 222, while the contact wheel 216 of the second roller assembly 230 is free to rotate. In this embodiment, the contact wheel 216 of the second roller assembly 230 is an idle roller that does not apply torque to the glass ribbon 105, but does provide pinch force between the first and second roller assemblies 220, 230, thereby modifying the pulling force applied to the glass ribbon 105 by the contact wheel 216 of the first roller assembly 220. While not depicted, it should be understood that the second roller assembly 230 may also include a drive motor similarly coupled to the shaft 214 and the contact wheel 216 that provides a torque to the contact wheel 216 as it contacts the glass ribbon 105. In such embodiments, both the first and second roller assemblies 220, 230 are actively driven by the respective drive motors, such that both drive motors of the roller pair 210 contribute to the tension in the glass ribbon 105.

Further, while the embodiment of the roller pair 210 of FIG. 2 depicts that the pneumatic actuator 248 is oriented with respect to the repositionable support member 242 to extend and retract in the direction of pinch force application, it should be understood that the pneumatic actuator 248 may be coupled to the repositionable support member 242 through a variety of solid or cable linkages that modify the direction of movement of the pneumatic actuator 248. In these embodiments (not shown), the pneumatic actuator continues to control positioning of the shaft and the contact wheel of the second roller assembly irrespective of orientation of the pneumatic actuator itself.

Still referring to FIG. 2, the actuation system 240 also includes a pneumatic reservoir 250 that is in fluid communication with the pneumatic actuator 248. The pneumatic reservoir 250 is adapted to supply fluid at a pressure greater than ambient pressure to each of the pneumatic actuators 248 of each of the roller pairs 210 (see FIG. 1). The pneumatic reservoir 250 may be coupled to each of the pneumatic actuators 248 of the draw apparatus 200 through a fluid manifold 252. The fluid manifold 252 places the pneumatic reservoir 250 into fluid communication with each of the pneumatic actuators 248, such that fluid is delivered to each of the pneumatic actuators 248 to control operation of the pneumatic actuators 248. The fluid manifold 252, therefore, provides for remote actuation of a plurality of pneumatic actuators 248 from a single operator station.

The contact wheels 216 of the first and second roller assemblies 220, 230 are generally cylindrical in shape. However, variations in the dimensions of the contact wheels 216, in particular the concentricity of the contact wheels 216 and bearings (not shown) about which the contact wheels 216 rotate may lead to variation in the run-out of the surface contacting the glass ribbon 105. These variations may lead to periodic variations in the normal force applied to the glass ribbon 105 as the distance between the contact wheels 216 of a roller pair 210 cyclically increase and decrease. The normal force applied to the glass ribbon 105 follows a similar periodic variation. Reduction in the variation of the normal force applied to the glass ribbon 105 may allow for a lower average normal force to be applied by the roller pairs 210, while maintaining a desired tension on the glass ribbon 105, and may reduce variation in the glass ribbon 105 itself. Embodiments of the draw apparatus 200 that include the second roller assembly 230 as described herein may exhibit reduced friction, such that the pneumatic actuators 248 allow the second roller assembly 230 to be repositioned autonomously based on the variations in the contact wheels 216. The low-friction properties of the second roller assembly 230 may, therefore, reduce the variations in the normal force applied by opposing contact wheels 216 by allowing the second roller assembly 230 to float with respect to the glass ribbon 105 and the first roller assembly 220. In some embodiments, a draw apparatus 200 incorporating first and second roller assemblies 220, 230 according to the present disclosure may limit the force variation applied to the glass ribbon 105 to less than about 3 pound force, for example, less than about 2 pound force, for example, less than about 1 pound force.

Figure 3:
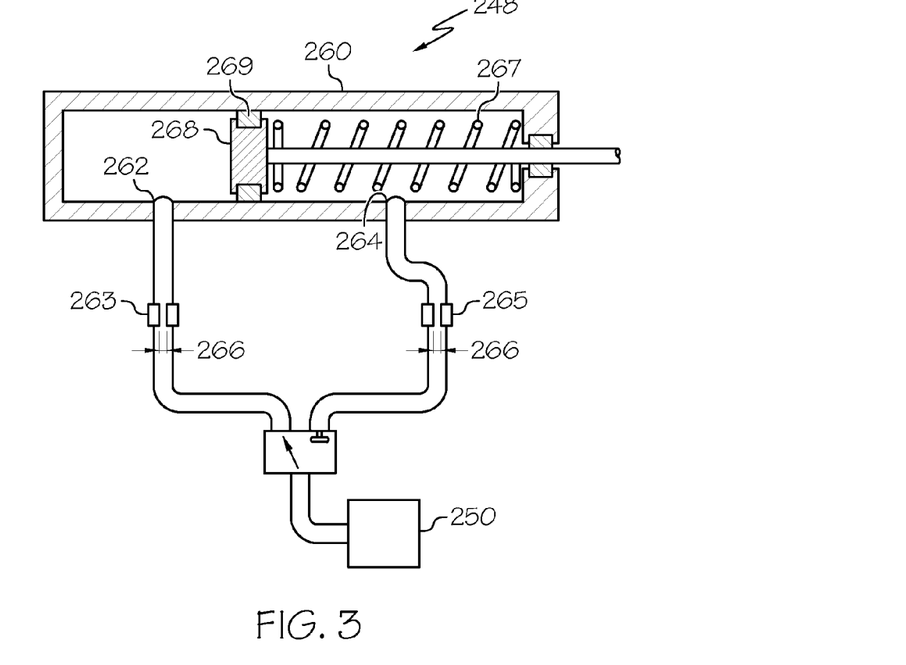
FIG. 3 schematically depicts a sectional side view of a pneumatic actuator of a glass manufacturing apparatus shown along line A-A of FIG. 2.

Referring now to FIG. 3, a schematic of a pneumatic actuator 248 incorporated into the actuation systems of the draw apparatus is depicted. In this embodiment, the pneumatic actuator 248 is a double-acting cylinder 260 that incorporates an extension inlet port 262 and a retraction inlet port 264, such that fluid supplied from the pneumatic reservoir acts along two sides of the piston 268. The extension inlet port 262 and the retraction inlet port 264 are positioned opposite the piston 268 that extends and retracts based on the balance of pressure along opposite sides of the piston 268. When fluid pressure in the cylinder 260 proximate to the extension inlet port 262 is greater than the fluid pressure in the cylinder 260 proximate to the retraction inlet port 264, the piston 268 will have a tendency to extend. While specific mention has been made herein to the "extend" direction and the "retract" direction, it should be understood that these directions are made in reference to the extension direction and retraction direction of the contact wheel, as depicted in FIG. 2. Accordingly, the extend direction and the retract direction may not correspond to the extend direction and the retract direction of the piston 268. When fluid pressure in the cylinder 260 proximate to the extension inlet port 262 is less than the fluid pressure in the cylinder 260 proximate to the retraction inlet port 264, the piston 268 will have a tendency to retract. As such, the pressure balance across the piston 268 may cause the piston 268 to extend and retract within the cylinder 260.

As depicted in FIG. 3, the pneumatic actuator 248 may also include an extension nozzle 263 in fluid communication with the extension inlet port 262 and a retraction nozzle 265 in fluid communication with the retraction inlet port 264. The extension nozzle 263 and the retraction nozzle 265 each include through-flow diameters 266 that are smaller than the diameter of the fluid manifold 252 and the extension inlet port 262 and the retraction inlet port 264, respectively. The through-flow diameters 266 of the extension nozzle 263 and the retraction nozzle 265 may restrict fluid flow through the nozzle, thereby restricting fluid flow into and out of the cylinder 260. By restricting fluid flow into and out of the cylinder 260, the extension speed and/or the retraction speed of the piston 268 can be reduced from a maximum extension speed and retraction speed, respectively, while maintaining the pinch force on the glass ribbon based on the pressure of the fluid supplied from the pneumatic reservoir.

In some embodiments, the flow-through rate of at least one of the extension nozzles 263 in fluid communication with one of the cylinders 260 may be at least 10% less than the flow-through rate of another of the extension nozzle 263 in fluid communication with another of the cylinders 260. A reduction in the flow-through rate of the extension nozzles 263 may reduce the extension speed of the piston 268 as compared to a cylinder 260 having an increased flow-through rate. The decrease in extension speed of the piston 268 may reduce the speed at which the pinch force is applied to the glass ribbon. The decrease in extension speed of the piston 268 may also allow for the timing of contact of the glass ribbon to be managed across a plurality of roller pairs, with roller pairs that include reduced flow-through rate extension nozzles contacting the glass ribbon at a later time than roller pairs that include higher flow-through rate extension nozzles, with all of the pistons supplied with fluid from the pneumatic reservoir.

The pneumatic actuator 248 may also include a fluid bearing 269 positioned between the piston 268 and the cylinder 260. The fluid bearing 269 may reduce the internal friction of the pneumatic actuator 248 as compared to pneumatic actuators having mechanically contacting piston rings.

The actuation system 240 may also include a force member 267 that applies a force to the second roller assembly 230 in a direction corresponding to retraction of the contact wheel, such that the force tends to separate the contact wheel of the second roller assembly 230 from the glass ribbon. In one embodiment, the force member 267 may be an axial spring coupled to the piston 268 of the cylinder 260 of the second roller assembly 230. The force member 267 applies a force to the piston 268 in a direction that corresponds to retracting the contact wheel from the glass ribbon. The force member 267 provides automatic retraction of the contact wheel from the glass ribbon in the event of loss of pressure of the fluid supply from the pneumatic reservoir.

Figure 4:
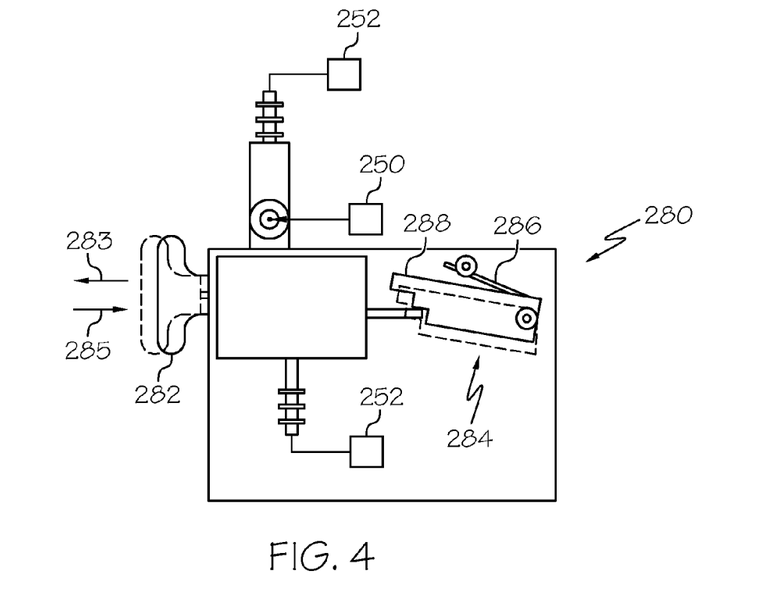
FIG. 4 schematically depicts a top view of an actuation switch of an actuation system according to one or more embodiments shown or described herein.

Referring now to FIG. 4, an actuation switch 280 that is in fluid communication with the pneumatic reservoir and at least one pneumatic actuator is depicted. The actuation switch 280 includes an actuation member 282 that allows an operator to selectively direct fluid flow through the actuation switch 280 itself to selectively extend or retract the pistons of the pneumatic actuators. The actuation switch 280 also includes a locking member 284 that includes a biasing element 286 and a repositionable detent 288. The biasing member engages the repositionable detent 288 to allow the actuation member 282 to translate in a first direction 283 corresponding to retraction of the contact wheels from the glass ribbon, while limiting the actuation member 282 from translating in a second direction 285 corresponding to extension of the contact wheels towards the glass ribbon. The operator may manually or autonomously reposition the repositionable detent 288 by overcoming the biasing element 286, such that the repositionable detent 288 is spaced apart from the actuation member 282, thereby allowing the actuation member 282 to direct fluid flow to the cylinders in a direction that tends to engage the contact wheels with the glass ribbon. As such, the repositionable detent 288 allows the operator to retract the contact wheels from the glass ribbon in a single operation (i.e., moving the actuation member 282), and prevents the operator from extending the contact wheels towards the glass ribbon in a single operation. Instead, the actuation switch 280 provides a redundant mechanism that forces the operator to perform multiple operations (i.e., repositioning the repositionable detent 288 and moving the actuation member 282) to extend the contact wheels toward the glass ribbon. The actuation switch 280, therefore, provides the operator with a simple interface to retract the contact wheels and a more-complicated interface to extend the contact wheels, thereby reducing likelihood of inadvertent extension of the contact wheels toward the glass ribbon.

While the actuation system may incorporate the actuation switch 280 as described hereinabove, it should be understood that the actuation system may incorporate a variety of electric, electro-mechanical, or hydraulic control systems to manage operation of the pneumatic actuators without departing from the scope of the present disclosure.

Figure 5:
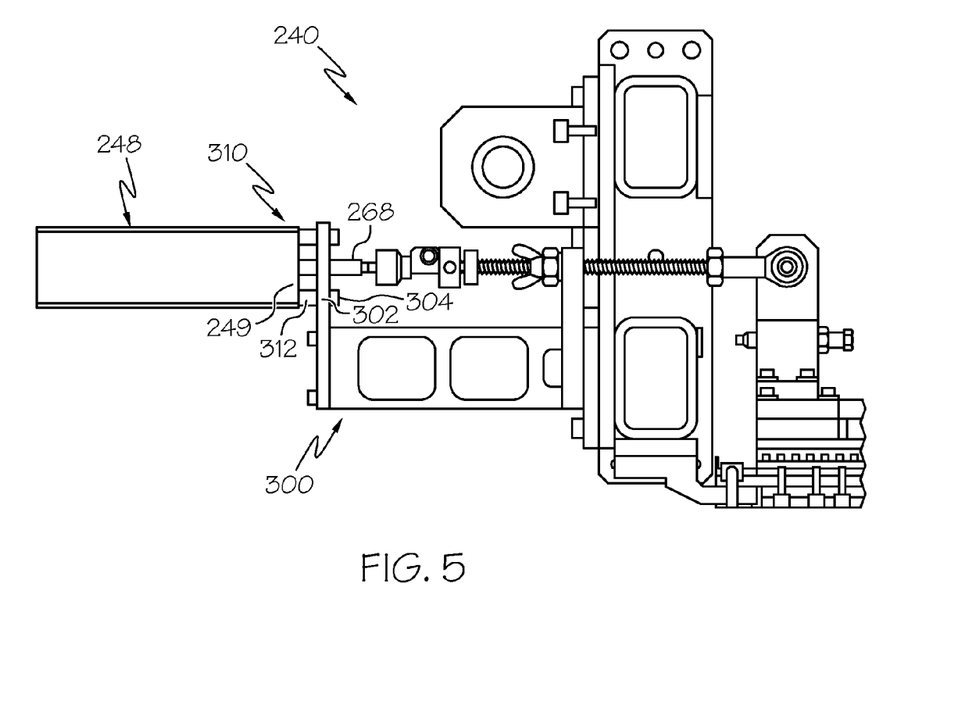
FIG. 5 schematically depicts a side view of an actuation system of a second roller assembly according to one or more embodiments shown or described herein.
Figure 6:
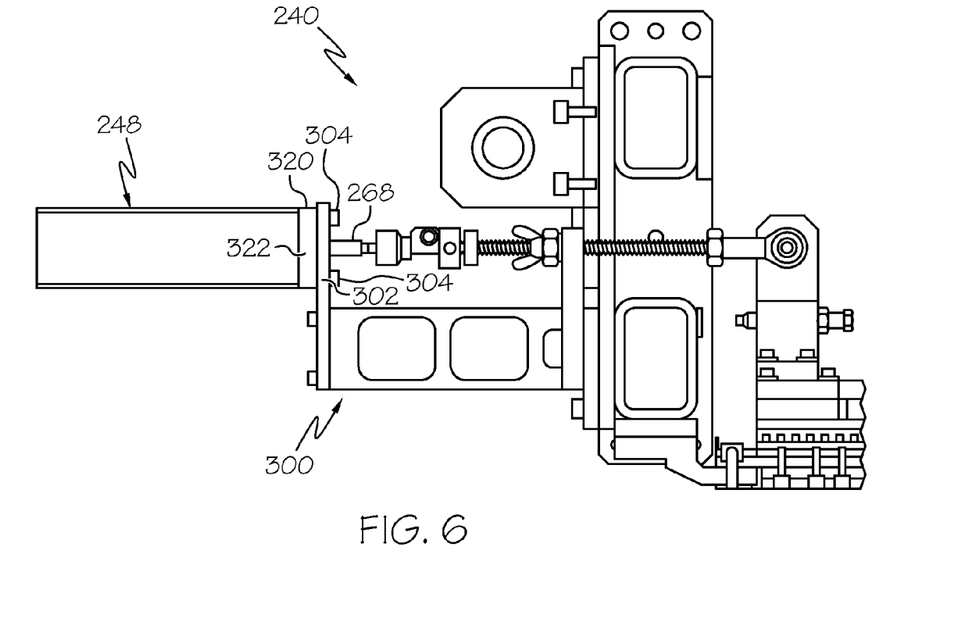
FIG. 6 schematically depicts a side view of an actuation system of a second roller assembly according to one or more embodiments shown or described herein.
Figure 7:
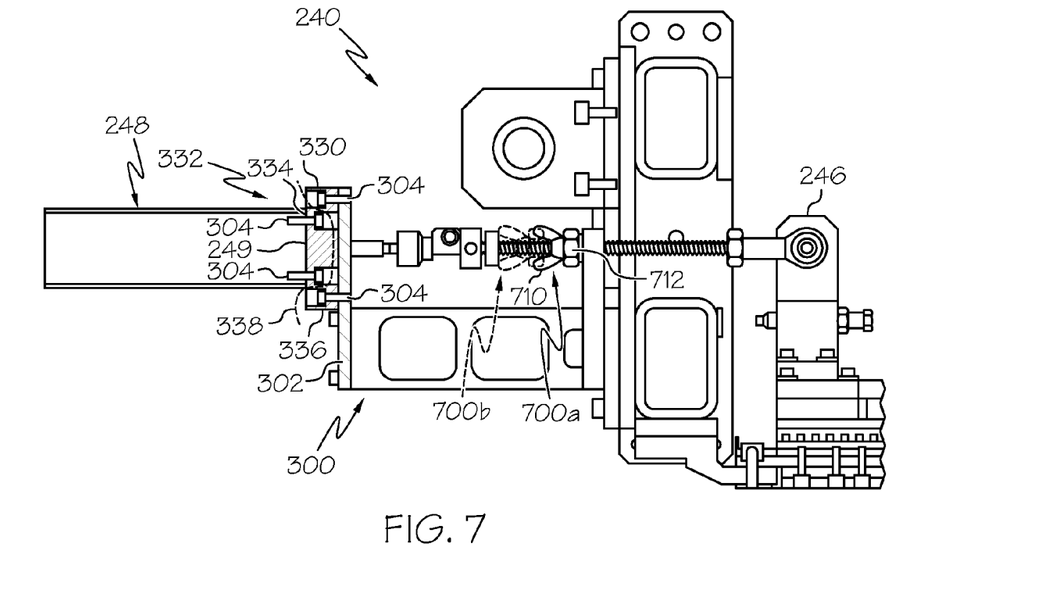
FIG. 7 schematically depicts a side view of an actuation system of a second roller assembly according to one or more embodiments shown or described herein.

Referring now to FIG. 5-7, various attachment configurations of the actuation system 240 to the roller pair are depicted. Because the glass ribbon processed in the draw apparatus is at an elevated temperature, components of the draw apparatus (including components of the actuation system 240) tend to increase in temperature due to their proximity to the glass ribbon. The increase in temperature of components of the draw apparatus, and in particular the pneumatic actuators 248 of the actuation systems 240, may decrease the performance of the components, for example by increasing the friction of the pneumatic actuators 248. In one example, an increase in temperature of components of the pneumatic actuators may lead to modifications in the dimensions of the piston 268 and piston seals that surround a portion of the piston 268 due to differences in the coefficient of thermal expansion of the various components. Modifications of the dimensions of these components may lead to narrowing of a clearance fit, which may tend to increase friction in the pneumatic actuator 248, or widening of the clearance fit, which may tend to increase fluid leakage from the pneumatic actuator 248. As discussed hereinabove, an increase in friction of the pneumatic actuator 248 may increase the average pinch force applied to the glass ribbon and may increase variability in the pinch force applied to the glass ribbon. Leakage of fluid from the pneumatic actuator 248 may similarly increase variability in the pinch force applied to the glass ribbon, and may therefore necessitate an increase in the average pinch force to reduce the likelihood of slippage between the contact wheels and the glass ribbon. Further, leakage of fluid from the pneumatic actuator 248 may locally reduce the heat transfer away from the glass ribbon, which may induce local stress into the glass ribbon, thereby negatively affecting the properties of components made from the glass ribbon.

The attachment configurations of the actuation system 240 depicted in FIGS. 5-7 reduce the heat transfer directed into the pneumatic actuator 248 from the glass ribbon as the glass ribbon moves through the draw apparatus 200. Each of the attachment configurations includes a thermally insulative member 310 made from a thermally insulative material such as a non-metallic material that increases the thermal resistance to heat input from the glass ribbon to the pneumatic actuator 248. Examples of such thermally insulative materials include polyetherimide (PEI) resins such as Ultem resins available from Sabic of Pittsfield, Mass., polyphenylsulfone (PPSU) resins such as Radel resins available from Solvay Advanced Polymers, LLC of Alpharetta, Ga., polyamide-imide (PAI) resins such as Torlon resins available from Solvay Advanced Polymers, LLC, and micarta laminated composites such as Garolite available from Norplex-Micarta Industrial Composites of Postville, Iowa. The thermally insulative materials may be available from a variety of commercial producers and/or sellers. The thermally insulative material may have a thermal conductivity less than the thermal conductivity of aluminum alloys and steel alloys, which the support frame is constructed of Referring now to FIG. 5, one embodiment of the thermally insulative member 310 includes a plurality of spacers 312 that are positioned between a mounting surface 249 of the pneumatic actuator 248 and a mating surface 302 of the support frame 300, and surround fasteners 304 that couple the pneumatic actuator 248 to the support frame 300. The spacers 312 reduce heat transfer from the mating surface 302 of the support frame 300 to the mounting surface 249 of the pneumatic actuator 248 by reducing a contact area interface between the mounting surface 249 and the mating surface 302.

Referring now to FIG. 6, another embodiment of the thermally insulative member 310 includes a spacer plate 320 that is positioned between the mounting surface 249 of the pneumatic actuator 248 and the mating surface 302 of the support frame 300. The spacer plate 320 includes a plurality of through-holes 322 through which fasteners 304 that couple the pneumatic actuator 248 to the support frame 300 extend.

Referring now to FIG. 7, another embodiment of the thermally insulative member 310 includes a blind spacer plate 330 that is positioned between the mounting surface 249 of the pneumatic actuator 248 and the mating surface 302 of the support frame 300. The blind spacer plate 330 includes a plurality of through holes 332. A first set 334 of the blind through holes 332 provide clearance for fasteners to couple the blind spacer plate 330 to the pneumatic actuator 248. A second set 336 of the blind through holes 332 provide clearance for fasteners to couple the blind spacer plate 330 to the support frame 300. By separating the fasteners coupling the blind spacer plate 330 to the pneumatic actuator 248 from the fasteners coupling the blind spacer plate 330 to the support frame 300, the blind spacer plate 330 creates a thermal break 338 in the conduction path between the mounting surface 249 of the pneumatic actuator 248 and the mating surface 302 of the support frame 300 such that no metallic elements (for example the fasteners 304) contact both the pneumatic actuator 248 and the support frame 300. Heat crossing the thermal break 338 of the blind spacer plate 330 therefore passes through the thermally insulative material of the blind spacer plate 330, which has a greater resistance to conductive heat transfer than the fasteners 304, such that the rate of heat transfer into the pneumatic actuator 248 is reduced.

Still referring to FIG. 7, the actuation system 240 may include an adjustable stop 700. The adjustable stop 700 limits translation of the piston of the pneumatic actuator 248 in at least one direction. As depicted in FIG. 7, the adjustable stop includes a positioning member 712 and a locking member 710. In the depicted embodiment, the positioning member 712 contacts the support frame 300, thereby limiting the translation of the movable frame 246. The locking member 710 is secured against the positioning member 712 and maintains the position of the positioning member 712 relative to the movable frame 246. An operator of the draw apparatus may selectively position the adjustable stop 700 to limit translation of the movable frame 246 by positioning the adjustable stop 700a in a limiting position, or to allow full stroke of the movable frame 246 by positioning the adjustable stop 700b in a clearance position. Limiting translation of the movable frame 246 may be helpful, for example, during repair or replacement of draw apparatus components. The contact wheels of the draw apparatus, as depicted in FIG. 2, are prone to wear and therefore are periodically replaced. By positioning the adjustable stop 700a in the limiting position relative to the support frame 300, an operator can secure the movable frame 246, and therefore the contact wheels for a replacement operation.

It should now be understood that draw apparatuses and roller pairs incorporating pneumatic actuators exhibit low friction actuation systems to manage pinch force applied to a glass ribbon by opposing contact rollers as the glass ribbon moves through the draw apparatuses. Reduction in variation of the pinch force may reduce the average force required to be applied to the glass ribbon, while minimizing the likelihood of slippage of the glass ribbon by the contact rollers. Each of the roller pairs in a draw apparatus may include pneumatic actuators that are in fluid communication with a pneumatic reservoir that controls pinch force across each of the roller pairs. Further, each of the pneumatic actuators may be simultaneously and remotely actuation, such that one operator can manage pinch force applied to the glass ribbon.

In a first aspect, the disclosure provides a roller pair for applying force to a glass ribbon moving in a draw direction comprising: a first roller assembly and a second roller assembly positioned along opposite sides of the glass ribbon, the first and second roller assemblies each comprising a shaft and a contact wheel coupled to the shaft, wherein: the shaft of the first roller assembly is coupled to a support frame; and the shaft of the second roller assembly is coupled to an actuation system, the actuation system comprising a repositionable support member allowing translation of the shaft of the second roller assembly in a direction transverse to the draw direction of the glass ribbon, a pneumatic actuator controlling a position of the contact wheel of the second roller assembly in the direction transverse to the draw direction of the glass ribbon, and a pneumatic reservoir in fluid communication with the pneumatic actuator delivering fluid at an elevated pressure to the pneumatic actuator.

In a second aspect, the disclosure provides a draw apparatus for applying force to a glass ribbon moving in a draw direction comprising: a support frame; and a plurality of roller pairs arranged at positions in the draw direction, each of the plurality of roller pairs comprising: a first roller assembly and a second roller assembly positioned along opposite sides of the glass ribbon, the first and second roller assemblies each comprising a shaft and a contact wheel coupled to the shaft, wherein: the shaft of the first roller assembly is coupled to the support frame; and the shaft of the second roller assembly is coupled to an actuation system, the actuation system comprising a repositionable support member allowing translation of the shaft of the second roller assembly in a direction transverse to the draw direction of the glass ribbon, a pneumatic actuator controlling a position of the contact wheel of the second roller assembly in the direction transverse to the draw direction of the glass ribbon, a pneumatic reservoir, and a fluid manifold coupled to pneumatic actuators of each of the roller pairs and the pneumatic reservoir placing the pneumatic reservoir in fluid communication with pneumatic actuators of each of the roller pairs.

In a third aspect, the disclosure provides the roller pair of any of the first and second aspects, wherein the pneumatic actuator comprises a double-acting cylinder using fluid delivered from the reservoir to extend and retract the pneumatic actuator.

In a fourth aspect, the disclosure provides the roller pair of the third aspect, wherein the pneumatic actuator further comprises an extension nozzle in fluid communication with an inlet port of the pneumatic actuator corresponding to the extend direction and a retraction nozzle in fluid communication with an inlet port of the pneumatic actuator corresponding to the retract direction, the extension nozzle and the retraction nozzle having a flow-through rate less than the respective inlet ports such that the extension nozzle and the retraction nozzle limit an extend speed and a retract speed, respectively, of the pneumatic actuator.

In a fifth aspect, the disclosure provides the roller pair of any of the first through fourth aspect, wherein the actuation system further comprises an actuation switch in fluid communication with the pneumatic reservoir and the pneumatic actuator, the actuation switch comprising: an actuation member selectively direct fluid flow through the actuation switch to extend or retract the pneumatic actuators; and a locking member comprising a biasing element and a repositionable detent, the biasing element engaging the repositionable detent to allow the actuation member to translate in a first direction and limit the actuation member from translating in a second direction.

In a sixth aspect, the disclosure provides the roller pair of any of the first through fifth aspects, wherein the actuation system further comprises a force member applying a force to the second roller assembly in a direction corresponding to separating the contact wheel of the second roller assembly from the glass ribbon.

In a seventh aspect, the disclosure provides the roller pair of any of the first through seventh aspects, wherein at least one of the first roller assembly or the second roller assembly further comprises a drive motor coupled to the shaft and controlling rotation of the contact wheel.

In an eighth aspect, the disclosure provides the roller pair of any of the first through seventh aspects, wherein the pneumatic actuator is coupled to the support frame.

In a ninth aspect, the disclosure provides the roller pair of the eighth aspect, wherein the actuation system further comprises a thermally insulative member positioned between a mounting surface of the pneumatic actuator and a mating surface of the support frame.

In a tenth aspect, the disclosure provides the roller pair of the ninth aspect, wherein: the support frame comprises a metallic material; and the thermally insulative member comprises a material having a thermal resistance greater than the metallic material of the support frame.

In an eleventh aspect, the disclosure provides the roller pair of the tenth aspect, wherein the thermally insulative member defines a thermal break, such that a conduction path from the support frame to the pneumatic actuator includes an interruption in metallic components.

In a twelfth aspect, the disclosure provides the roller pair of any of the first through tenth aspects, wherein the actuation system further comprises a force member applying a force to the second roller assembly in a direction corresponding to separating the contact wheel of the second roller assembly from the glass ribbon.

In a thirteenth aspect, the disclosure provides the roller pair of any of the fourth through twelfth aspects, wherein the flow-through rate of the extension nozzle of at least one of the pneumatic actuators is at least 10% less than the flow-through rate of the extension nozzle of another pneumatic actuator.

In a fourteenth aspect, the disclosure provides the draw apparatus of the second aspect, further comprising an actuation switch in fluid communication with the pneumatic reservoir and the pneumatic actuator of each of the roller pairs, the actuation switch comprising: an actuation member adapted to selectively direct fluid flow through the actuation switch to extend or retract the pneumatic actuators of each of the roller pairs; and a locking member comprising a biasing element and a repositionable detent, the biasing element engaging the repositionable detent to allow the actuation member to translate in a first direction and limit the actuation member from translating in a second direction.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A roller pair for applying force to a glass ribbon moving in a draw direction comprising:
a first roller assembly and a second roller assembly positioned along opposite sides of the glass ribbon, the first and second roller assemblies each comprising a shaft and a contact wheel coupled to the shaft, wherein:
the shaft of the first roller assembly is coupled to a support frame;
the shaft of the second roller assembly is coupled to an actuation system, the actuation system comprising a repositionable support member allowing translation of the shaft of the second roller assembly in a direction transverse to the draw direction of the glass ribbon, a pneumatic actuator controlling a position of the contact wheel of the second roller assembly in the direction transverse to the draw direction of the glass ribbon, and a pneumatic reservoir in fluid communication with the pneumatic actuator delivering fluid at an elevated pressure to the pneumatic actuator, wherein the pneumatic actuator is coupled to the support frame; and the actuation system further comprises a thermally insulative member positioned between a mounting surface of the pneumatic actuator and a mating surface of the support frame.

2. The roller pair of claim 1, wherein the pneumatic actuator comprises a double-acting cylinder using fluid delivered from the reservoir to extend and retract the pneumatic actuator.

3. The roller pair of claim 2, wherein the pneumatic actuator further comprises an extension nozzle in fluid communication with an inlet port of the pneumatic actuator corresponding to the extend direction and a retraction nozzle in fluid communication with an inlet port of the pneumatic actuator corresponding to the retract direction, the extension nozzle and the retraction nozzle having a flow-through rate less than the respective inlet ports such that the extension nozzle and the retraction nozzle limit an extend speed and a retract speed, respectively, of the pneumatic actuator.

4. The roller pair of claim 1, wherein the actuation system further comprises an actuation switch in fluid communication with the pneumatic reservoir and the pneumatic actuator, the actuation switch comprising:
   an actuation member adapted to selectively direct fluid flow through the actuation switch to extend or retract the pneumatic actuators; and
   a locking member comprising a biasing element and a repositionable detent, the biasing element engaging the repositionable detent to allow the actuation member to translate in a first direction and limit the actuation member from translating in a second direction.

5. The roller pair of claim 1, wherein the actuation system further comprises a force member applying a force to the second roller assembly in a direction corresponding to separating the contact wheel of the second roller assembly from the glass ribbon.

6. The roller pair of claim 1, wherein at least one of the first roller assembly or the second roller assembly further comprises a drive motor coupled to the shaft and controlling rotation of the contact wheel.

7. The roller pair of claim 1, wherein:
   the support frame comprises a metallic material; and
   the thermally insulative member comprises a material having a thermal resistance greater than the metallic material of the support frame.

8. The roller pair of claim 7, wherein the thermally insulative member defines a thermal break, such that a conduction path from the support frame to the pneumatic actuator includes an interruption in metallic components.

9. A draw apparatus for applying force to a glass ribbon moving in a draw direction comprising:
   a support frame; and
   a plurality of roller pairs arranged at positions in the draw direction, each of the plurality of roller pairs comprising:
      a first roller assembly and a second roller assembly positioned along opposite sides of the glass ribbon, the first and second roller assemblies each comprising a shaft and a contact wheel coupled to the shaft, wherein:
      the shaft of the first roller assembly is coupled to the support frame; and
      the shaft of the second roller assembly is coupled to an actuation system, the actuation system comprising a repositionable support member allowing translation of the shaft of the second roller assembly in a direction transverse to the draw direction of the glass ribbon, a pneumatic actuator controlling a position of the contact wheel of the second roller assembly in the direction transverse to the draw direction of the glass ribbon, a pneumatic reservoir, and a fluid manifold coupled to pneumatic actuators of each of the roller pairs and the pneumatic reservoir placing the pneumatic reservoir in fluid communication with pneumatic actuators of each of the roller pairs, wherein the pneumatic actuators of each of the roller pairs are coupled to the support frame; and the actuation system further comprises a thermally insulative member positioned between a mounting surface of the pneumatic actuator and a mating surface of the support frame.

10. The draw apparatus of claim 9, wherein the pneumatic actuators of each of the roller pairs further comprise an extension nozzle in fluid communication with an inlet port of the pneumatic actuator corresponding to the extend direction and a retraction nozzle in fluid communication with an inlet port of the pneumatic actuator corresponding to the retract direction, the extension nozzle and the retraction nozzle having a flow-through rate less than the respective inlet ports such that the extension nozzle and the retraction nozzle limit an extend speed and a retract speed, respectively, of the pneumatic actuator.

11. The draw apparatus of claim 10, wherein the flow-through rate of the extension nozzle of at least one of the pneumatic actuators is at least 10% less than the flow-through rate of the extension nozzle of another pneumatic actuator.

12. The draw apparatus of claim 9, further comprising an actuation switch in fluid communication with the pneumatic reservoir and the pneumatic actuator of each of the roller pairs, the actuation switch comprising:
   an actuation member adapted to selectively direct fluid flow through the actuation switch to extend or retract the pneumatic actuators of each of the roller pairs; and
   a locking member comprising a biasing element and a repositionable detent, the biasing element engaging the repositionable detent to allow the actuation member to translate in a first direction and limit the actuation member from translating in a second direction.

13. The draw apparatus of claim 9, wherein at least one of the first roller assembly or the second roller assembly of each of the roller pairs further comprises a drive motor coupled to the shaft and controlling rotation of the contact wheel.

14. The draw apparatus of claim 9, wherein:
   the support frame comprises a metallic material; and
   the thermally insulative member comprises a material having a thermal resistance greater than the metallic material of the support frame.

15. The draw apparatus of claim 14, wherein the thermally insulative member defines a thermal break, such that a conduction path from the support frame to the pneumatic actuator includes an interruption in metallic components.

16. The draw apparatus of claim 9, wherein the actuation system further comprises a force member applying a force to the second roller assembly in a direction corresponding to separating the contact wheel of the second roller assembly from the glass ribbon.

17. A roller pair for applying force to a glass ribbon moving in a draw direction comprising:
   a first roller assembly and a second roller assembly positioned along opposite sides of the glass ribbon, the first and second roller assemblies each comprising a shaft and a contact wheel coupled to the shaft, wherein:

the shaft of the first roller assembly is coupled to a support frame;

the shaft of the second roller assembly is coupled to an actuation system, the actuation system comprising a repositionable support member allowing translation of the shaft of the second roller assembly in a direction transverse to the draw direction of the glass ribbon, a pneumatic actuator controlling a position of the contact wheel of the second roller assembly in the direction transverse to the draw direction of the glass ribbon, and a pneumatic reservoir in fluid communication with the pneumatic actuator delivering fluid at an elevated pressure to the pneumatic actuator;

the actuation system further comprises an actuation switch in fluid communication with the pneumatic reservoir and the pneumatic actuator, the actuation switch comprising:
- an actuation member selectively direct fluid flow through the actuation switch to extend or retract the pneumatic actuators; and
- a locking member comprising a biasing element and a repositionable detent, the biasing element engaging the repositionable detent to allow the actuation member to translate in a first direction and limit the actuation member from translating in a second direction.

18. The roller pair of claim 17, wherein the pneumatic actuator comprises a double-acting cylinder using fluid delivered from the reservoir to extend and retract the pneumatic actuator.

19. The roller pair of claim 18, wherein the pneumatic actuator further comprises an extension nozzle in fluid communication with an inlet port of the pneumatic actuator corresponding to the extend direction and a retraction nozzle in fluid communication with an inlet port of the pneumatic actuator corresponding to the retract direction, the extension nozzle and the retraction nozzle having a flow-through rate less than the respective inlet ports such that the extension nozzle and the retraction nozzle limit an extend speed and a retract speed, respectively, of the pneumatic actuator.

20. The roller pair of claim 17, wherein the actuation system further comprises a force member applying a force to the second roller assembly in a direction corresponding to separating the contact wheel of the second roller assembly from the glass ribbon.

21. The roller pair of claim 17, wherein at least one of the first roller assembly or the second roller assembly further comprises a drive motor coupled to the shaft and controlling rotation of the contact wheel.

* * * * *